(12) United States Patent
Hobbs

(10) Patent No.: US 7,864,857 B1
(45) Date of Patent: Jan. 4, 2011

(54) DATA COMPARISON METHODS AND APPARATUS SUITABLE FOR IMAGE PROCESSING AND MOTION SEARCH

(75) Inventor: David V. Hobbs, Surrey (CA)

(73) Assignee: Teradici Corporation, Burnaby, British Columbia (CA)

( * ) Notice: Subject to any disclaimer, the term of this patent is extended or adjusted under 35 U.S.C. 154(b) by 1588 days.

(21) Appl. No.: 11/173,318

(22) Filed: Jun. 30, 2005

Related U.S. Application Data

(60) Provisional application No. 60/584,603, filed on Jun. 30, 2004.

(51) Int. Cl.
 *H04N 7/12* (2006.01)
 *G06T 5/00* (2006.01)
(52) U.S. Cl. .................................. 375/240.16; 382/268
(58) Field of Classification Search .................. 348/416, 348/699, 398, 417, 413, 405, 406, 419, 409, 348/415, 420, 424, 391, 607, 610; 382/240, 382/236; 375/240.12, 240.24, 240.17, 240.16, 375/240.15, 240.19
See application file for complete search history.

(56) References Cited

U.S. PATENT DOCUMENTS

| | | | | |
|---|---|---|---|---|
| 5,583,573 | A | | 12/1996 | Asamura et al. |
| 5,726,712 | A | | 3/1998 | Ogura |
| 5,748,243 | A | * | 5/1998 | Suzuki .................. 375/240.03 |
| 5,949,555 | A | | 9/1999 | Sakai et al. .................. 358/462 |
| 5,990,852 | A | | 11/1999 | Szamrej .......................... 345/2 |
| 6,633,670 | B1 | | 10/2003 | Matthews ................... 382/176 |
| 6,664,969 | B1 | | 12/2003 | Emerson et al. ............. 345/544 |
| 7,020,201 | B2 | * | 3/2006 | Luo et al. .............. 375/240.16 |
| 7,050,502 | B2 | * | 5/2006 | Yasunari et al. ........ 375/240.16 |
| 2002/0009287 | A1 | * | 1/2002 | Ueda ............................ 386/68 |
| 2004/0062313 | A1 | * | 4/2004 | Schoenblum .......... 375/240.25 |
| 2004/0095998 | A1 | * | 5/2004 | Luo et al. .............. 375/240.16 |
| 2006/0071825 | A1 | * | 4/2006 | Demos ........................ 341/50 |

OTHER PUBLICATIONS

Chan, Yum-Lam. et al., "New Adaptive Pixel Decimation for Block Motion Vector Estimation," *IEEE Trans. Circuits Syst. Video Technol.*, vol. 6, No. 1, pp. 113-118, Feb. 1996.

He, Z.L .et al, "Low Power Motion Estimation Design Using Adaptive Pixel Truncation," *Proceedings of the 1997 international symposium on Low power electronics and design*, Monterey CA—USA, pp. 167-172, 1997.

He, Zhongli et al., "Reducing Hardware Complexity of Motion Estimation Algorithms Using Truncated Pixels", *Proc. IEEE ISCAS'97*, vol. 4, pp. 2809-2812, Jun. 1997.

He, Zhong-Li et al., "Low-Power VLSI Design for Motion Estimation Using Adaptive Pixel Truncation," IEEE Transactions on Circuits and Systems for Video Technology, vol. 10, No. 5, pp. 669-678, Aug. 2000.

(Continued)

*Primary Examiner*—Behrooz Senfi
(74) *Attorney, Agent, or Firm*—Lewis and Roca LLP

(57) ABSTRACT

A method and apparatus for calculating the quantized difference between a pixel in a current frame and a pixel in a reference frame is disclosed. The apparatus of the present invention generates a "1 of n" significant difference bit output which may easily be logically OR'd with the difference values from other comparisons to determine the maximum difference over an area of pixels.

24 Claims, 17 Drawing Sheets

OTHER PUBLICATIONS

Ko, Young-Ki et al., "VLSI Architecture for Fast Motion Estimation Based on Bit-Plane Matching," *Journal of the Korean Physical Society*, vol. 37, No. 6, pp. 938-944, Dec. 2000.

Komarek, Thomas et al., "Array Architecture for Block Matching Algorithms," *IEEE Trans. on Circuits and Systems*, vol. 36, No. 10, pp. 1301-1308, Oct. 1989.

Kuroda, Y. et al., "A Sub-mW MPEG-4 Motion Estimation Processor Core for Mobile Video Application," *ASP-DAC*, pp. 527-528, 2004.

Lam, Kin-Hung et al., "Low Power 2-D Array VLSI Architecture for Block Matching Motion Estimation Using Computation Suspension," Signal Processing Systems, 2000, SiPS 2000, 2000 IEEE Workshop, pp. 60-69, Oct. 11-13, 2000.

Liu, Yilong et al., "Complexity Comparison of Fast Block-Matching Motion Estimation Algorithms," ICASSP, pp. 341-344, 2004.

López, S., et al., "A High Quality/Low Computational Cost Technique for Block Matching Motion Estimation," Proceedings of the Design, Automation, and Test in Europe Conference and Exhibition, IEEE Computer Society Automation and Test in Europe (DATE'05), Munich, Germany, vol. 3, pp. 2-7 Mar. 7-11, 2005.

O'Connor, N. et al., "Hardware Acceleration Architectures for Mpeg-Based Mobile Video Platforms: A Brief Overview," Proc. 4th European Workshop on Image Analysis for Multimedia Interactive Services (WIAMIS), London, pp. 456-461, Apr. 2003.

Po, L. M. et al., "A Novel Four-Step Search Algorithm for Fast Block Motion Estimation," *IEEE Trans. Circuits Syst. Video Technol.*, vol. 6, pp. 313-317, Jun. 1996.

Ramachandran, S. et al., "FPGA Implementation of a Novel, Fast Motion Estimation Algorithm for Real-Time Video Compression," International Symposium on Field Programmable Gate Arrays Proceedings of the 2001 ACM/SIGDA ninth international symposium on Field Programmable Gate Arrays, Monterey CA, pp. 213-219, 2001.

Roma, Nuno, "Customisable Core-Based Architectures for Real-Time Motion Estimation on FPGAs," Instituto Superior Técnico/INESC-ID, *FPL*, pp. 745-754, 2003.

Yang, K-M et al., "A family of VLSI Designs for the Motion Compensation Block Matching Algorithm," *IEEE Trans. on Circuits and Systems*, vol. 36, No. 10, pp. 1317-1325, Oct. 1989.

Wang, Y. K. et al., "A Globally Adaptive Pixel-Decimation Algorithm for Block-Motion Estimation," *IEEE Trans. Circuits Syst. Video Technol.*, vol. 10, No. 6, pp. 1006-1011, Sep. 2000.

Zhou, Feng, et al., "Bit Serial Structure for Full-Search Block-Matching Algorithm," http://citeseer.ist.psu.edu/258882.html, 10 pages Jun. 21, 1995.

\* cited by examiner

FIG. 7

| 3-bit Subject Value A | 3-bit Reference B | Quantized Value |
|---|---|---|
| 110 | 000 | 0 |
| 110 | 001 | 1 |
| 110 | 010 | 1 |
| 110 | 011 | 1 |
| 110 | 100 | 0 |
| 110 | 101 | 0 |
| 110 | 110 | 0 |
| 110 | 111 | 0 |
| 110 | 000 | 0 |
| 110 | 001 | 1 |
| 110 | 010 | 1 |
| 110 | 011 | 1 |
| 110 | 100 | 0 |
| 110 | 101 | 0 |
| 110 | 110 | 0 |
| 110 | 111 | 0 |

3 Bit Comparison Table

FIG. 8

| 2-bit Subject Value A | 2-bit Reference B | Quantized Value |
|---|---|---|
| 11x | 00x | 0 |
| 11x | 00x | 0 |
| 11x | 01x | 1 |
| 11x | 01x | 1 |
| 11x | 10x | 0 |
| 11x | 10x | 0 |
| 11x | 11x | 0 |
| 11x | 11x | 0 |
| 11x | 00x | 0 |
| 11x | 00x | 0 |
| 11x | 01x | 1 |
| 11x | 01x | 1 |
| 11x | 10x | 0 |
| 11x | 10x | 0 |
| 11x | 11x | 0 |
| 11x | 11x | 0 |

2 Bit Comparison Table

FIG. 9

| 3-bit Subject Value A | 3-bit Reference B | Quantized Value |
|---|---|---|
| 110 | 000 | 1 |
| 110 | 001 | 1 |
| 110 | 010 | 1 |
| 110 | 011 | 1 |
| 110 | 100 | 0 |
| 110 | 101 | 0 |
| 110 | 110 | 0 |
| 110 | 111 | 0 |
| 110 | 000 | 1 |
| 110 | 001 | 1 |
| 110 | 010 | 1 |
| 110 | 011 | 1 |
| 110 | 100 | 0 |
| 110 | 101 | 0 |
| 110 | 110 | 0 |
| 110 | 111 | 0 | msb Comparison Table

FIG. 10

| $2^n$ | Quantized Output Value | Quantized Output Binary | No. of 8-bit Matches | Difference \|A-B\| |
|---|---|---|---|---|
| x | 0 | 00000000 | 1 | 0 |
| 0 | 1 | 00000001 | 2 | 1 |
| 1 | 2 | 00000010 | 2 | 2 |
| 2 | 4 | 00000100 | 5 | 3-5 |
| 3 | 8 | 00001000 | 10 | 5-11 |
| 4 | 16 | 00010000 | 20 | 9-23 |
| 5 | 32 | 00100000 | 40 | 17-47 |
| 6 | 64 | 01000000 | 80 | 33-95 |
| 7 | 128 | 10000000 | 96 | 65-255 |
| Total | | | 256 | |

Qunatized Output Values

| x | y | $QD_{(x,y)}$ |
|---|---|---|
| 0 | 0 | 00000000 |
| 0 | 1 | 00000001 |
| 0 | 2 | 00000001 |
| 0 | 3 | 00000100 |
| 1 | 0 | 00000100 |
| 1 | 1 | 00000001 |
| 1 | 2 | 00000100 |
| 1 | 3 | 00000100 |
| 2 | 0 | 00001000 |
| 2 | 1 | 00000000 |
| 2 | 2 | 00000001 |
| 2 | 3 | 00000001 |
| 3 | 0 | 00000000 |
| 3 | 1 | 00000100 |
| 3 | 2 | 00000000 |
| 3 | 3 | 00000100 |
| OR'd | | 00001101 — 110 |
| Fixed | | 00001000 — 112 |

Example (a):
4x4 Quantized Differences
OR'd and Filtered

FIG. 11b

| x | y | $QD_{(x,y)}$ |
|---|---|---|
| 0 | 0 | 00000000 |
| 0 | 1 | 00000001 |
| 0 | 2 | 00000001 |
| 0 | 3 | 00000101 |
| 1 | 0 | 00000111 |
| 1 | 1 | 00000001 |
| 1 | 2 | 00000100 |
| 1 | 3 | 00000110 |
| 2 | 0 | 00001010 |
| 2 | 1 | 00000000 |
| 2 | 2 | 00000001 |
| 2 | 3 | 00000001 |
| 3 | 0 | 00000000 |
| 3 | 1 | 00000100 |
| 3 | 2 | 00000000 |
| 3 | 3 | 00000110 |
| OR'd | | 00001111 — 114 |
| Fixed | | 00001000 — 116 |

Example (b):
4x4 Unfiltered Quantized
Differences OR'd and Filtered

Single Bit of the Quantized Difference Circuit

Two Bits of the Quantized Difference Circuit

8 Bit Quantized Difference Circuit

4x4 OR'd Quantized Difference Circuit

8x8 Sum of OR'd Quantized Differences

US 7,864,857 B1

DATA COMPARISON METHODS AND APPARATUS SUITABLE FOR IMAGE PROCESSING AND MOTION SEARCH

RELATED APPLICATION

This application claims priority to U.S. Provisional Application Ser. No. 60/584,603, entitled "Data Comparison Methods and Apparatus Suitable for Image Processing and Motion Search that Quantizes the Difference Between Data," filed Jun. 30, 2004.

FIELD OF THE INVENTION

The present invention relates broadly to the field of image processing. More specifically, the present invention is directed to a method and apparatus for searching data as might be used in a video encoding application.

BACKGROUND OF THE INVENTION

Video encoder designs dedicate large die areas to motion search circuitry as motion search is critical to temporal compression and a required function to achieve high compression ratios. Motion search is normally the most computational intensive component of a video encoder and can occupy 50% or more of the die area of a video encoder integrated circuit. FIG. 1 shows two frames of an image sequence. New or current frame 10 is to be compressed. Compression is accomplished by first dividing the frame into blocks and then searching for features of each block in previous reference frame 11. The purpose of the search algorithm is to find the best matching block in the reference frame that has the same pixel features 15 in the reference frame as the block in current frame 12.

There are a number of algorithms used to search for the best matched image. The most common algorithm is known as the sum of absolute differences (SAD) algorithm. The instance of the SAD algorithm shown below is for a k×k pixel block at location (x, y) of the new subject frame A that is compared with the reference frame B. The comparison is done at a vector (r, s) from the block being searched on subject frame A. The SAD algorithm sums the absolute difference of each pixel pair.

$$SAD(x, y, r, s) = \sum_{i=0}^{k-1} \sum_{j=0}^{k-1} |A_{(x+i,y+j)} - B_{((x+r)+i),((y+s)+j)}| \quad (1)$$

In a thorough search, the SAD algorithm is executed for each pixel or sub-pixel location in the area to be searched. In an example where the search covers +/−16 pixels, the equation is repeated 33 quantity squared (1089) times.

FIG. 2 illustrates a graph of the results from the SAD algorithm as achieved for the search for a block on the subject frame 12 over a search area on the reference frame 13 for two frames of the well known "foreman" video test sequence. The graph is inverted showing point of minimum error 20 at the highest point of the contour and identifies the location of the search area on the reference frame that best correlates with the subject block. The center of the search 22 identifies areas of the reference frame that are poorly correlated with the subject block.

A common approach for implementing the SAD equation is shown in FIGS. 3 and 4. FIG. 3 shows an inverter used to determine an absolute value of the difference between two pixels. The pixel values A In 30 and B In 31 are unsigned 8-bit values that need to be compared. The smaller of the two input values is inverted using Exor blocks 32 and 33, generating a 1's complement negative number. When added to the other number and disregarding the carry, a positive or absolute result is generated. The logic diagram shown is simplified in two ways. Rather than using a full 8-bit adder, a single carry out 34 is generated. Secondly, a 1's complement number is created. This is corrected later in the circuit by adding 1 to the result.

FIG. 4 shows the full 8×8 pixel SAD circuit. Inverter 40 (FIG. 3) is repeated 64 times, generating 128 8-bit values that are summed together. The 1's complement correction is added as a constant (reference numeral 42). Summing circuits 44 and 46 are implemented as adder trees to improve performance generating two values that are finally summed together in module 48 to generate a single, 14-bit output value (SAD 49).

An alternative equation used to determine the closest matching block is the sum of squared differences (SSD) shown below for 8×8 block size.

$$SAD(x, y, r, s) = \sum_{i=0}^{7} \sum_{j=0}^{7} \left[ A_{(x+i,y+j)} - B_{((x+r)+i),((y+s)+j)} \right] \quad (2)$$

Instead of determining the absolute value of the difference between each pair of pixels, the SSD equation squares the difference providing a positive number proportional to the power of the difference. This equation replaces the 64 inverter circuits 40 of FIG. 4 with 64 8-bit multipliers each generating a 16-bit value. The summing circuit then sums the 64 16-bit values to generate a 22-bit result.

FIG. 5 illustrates a graph of the results from the SSD equation above as implemented for the same image as used for the SAD graph in FIG. 2. In this search, minimum difference 50 is located at the same location as the SAD calculation.

A video encoder motion search system may use alternative search strategies or algorithms to reduce the computational demands of a search or increase the quality of the search and thereby improve the compression ratio. One example of a strategy to reduce the processing time is to deploy a reduced search algorithm that searches only a limited series of search vectors rather than the full search described above. These methods only search selective areas and produce similar results to the full search techniques but use fewer processing resources.

Reduced search algorithms increase the search speed by limiting the coverage but do not reduce the circuitry needed to perform each search. The absolute difference calculation relies on complete difference calculations of pixels in the reference frame and current frame as required for the SAD calculation. Additionally, these fast search algorithms typically only find a local solution over a fixed search range.

An alternative approach to achieving more efficient searches is to reduce the number of pixels used in the comparison. This approach reduces the power consumption of the estimation circuit by reducing the number of calculations in the difference equation but still relies on complex adder circuitry required for the difference equation.

Yet another method combines full block search methods with predictive block matching in what is described as an adaptive cost block matching (ACBM) technique. The ACBM method applies a full search only to limited regions, achieving a similar distortion to full search methods but with up to 95% reduction in computational load. This method characterizes the image by identifying low textured areas suitable for full search block matching while also identifying correlated motion vectors. In one implementation, the motion vectors of a ten frame modeled sequence are compared with those of the original sequence to determine the regions of the image suited to a full-scale search. This method may be suitable for latency-insensitive streaming applications like broadcast video that tolerate a long compression delay but is not suitable for interactive applications that require low-latency encoding. Moreover, the multi-frame buffering requirement is cost prohibitive for high-resolution or large format video applications.

An example of a method that reduces the search circuitry is the truncated pixel search. The truncated pixel search reduces processing resources by comparing a limited resolution for each pixel and reduces the gate count to approximately half of the gates required for a full search method using systolic arrays methods.

This approach is unsuitable for the encoding of some high quality video streams where picture quality is highly dependent on the prediction error and the low-resolution pixel comparison both increases this error and decreases the video quality. To overcome this, an adaptive mask that truncates the number of significant bits in real time based on quality requirements has been proposed. This approach reduces power consumption but increases circuit complexity to support full pixel comparisons when demanded.

In summary, computationally-expensive, full-search methods produce accurate displacement vectors while reduced-search and truncated-pixel methods have been shown to be somewhat more processor-efficient. The dominant factor that determines the compression ratio for an encoding algorithm remains the number of searches executed by the algorithm. The more searches that are performed, either over a large area or at a sub-pixel resolution, the better the resultant compression. Regardless of the method selected, real-time computational performance of one tera operations per second or more is required to accomplish a reasonably thorough search at sub-pixel resolution over a large image. Even at very high clock speeds, a large proportion of the die area must be dedicated to the motion search function. Thus, the greatest challenge still remains the reduction of large die areas or circuitry required to achieve the vast quantity of difference calculations needed to achieve an acceptable compression ratio.

SUMMARY OF THE INVENTION

The primary objective of the invention is to provide an apparatus and method for performing the difference measurements used in a motion search circuit using reduced circuitry and offering higher efficiency than existing solutions. The present invention system provides a method and apparatus for estimating the difference between two blocks of pixels and achieves the same result as alternative techniques such as SAD and SSD methods. However, embodiments of the present invention require less circuitry and consequently enable the construction of smaller, faster and more power efficient devices that can be operated more efficiently than prior solutions. The die area saved by the present invention allows for other efficiencies in the motion search process. For example the additional die area may be used to increase the search area, thus improving the overall compression ratio in an encoding application. Furthermore, the quantization method of the present invention provides an intelligent trade-off in accuracy in the search result depending upon the correlation between the subject area and the reference area being searched. When the subject features are closely matched with those of the reference, the method of the present invention yields a reduced quantization error, thus allowing accurate selection from a number of closely matching vectors. As the correlation between the subject and reference decreases indicating a low-confidence motion vector, the quantization noise increases and the accuracy of the motion vector selection decreases, which neither degrades the video quality nor reduces the efficiency of the encoder.

In one aspect, the present invention provides a method and apparatus for calculating the quantized difference between a pixel in a current frame and a pixel in a reference frame. The apparatus of the present invention generates a "1 of n" significant difference bit output which may easily be logically OR'd with the difference values from other comparisons to determine the maximum difference over an area of pixels. The apparatus of the present invention also improves the worst-case propagation path over an equivalent SAD circuit.

In another aspect, the present invention provides a method and apparatus for calculating the quantized difference between a sub-block of pixels in the current frame and a sub-block of pixels in the reference frame.

In another aspect, the present invention provides a method and apparatus for calculating an approximation of the maximum quantized difference over a sub-block. The OR'ing method described provides the greatest improvement in performance and size over a traditional SAD circuit. The worst-case circuit path is much shorter than that of the SAD circuit, allowing the present invention to run at higher frequencies, resulting in less circuitry, or with less pipelining. The OR'ing circuit of the present invention is also smaller than full adder circuits used by existing solutions.

In yet another aspect, the present invention provides a method and apparatus for calculating an approximation of the sum of maximum quantized differences over a block in the subject frame that provides an approximation of the difference between that block and the block under comparison in the reference frame. The sum of maximum quantized difference module of the present invention provides a summation without long carry values and therefore does not need fast carry circuits. As a result, the summation circuit is faster and simpler than the reduction circuit in a SAD implementation.

Additional features and advantages of the present invention will become apparent from reading the following detailed description, when considered in conjunction with the drawings.

BRIEF DESCRIPTION OF THE DRAWINGS

FIG. 7 is an example comparison table used to generate a 1-bit output by comparing two 3-bit values.

FIG. 8 is an example of a comparison table used to generate a 1-bit output by comparing two 2-bit values.

FIG. 9 is part of a comparison table used to generate a 1-bit output by comparing the two most significant 3-bit values.

FIG. 10 is a table summarizing the quantized outputs.

FIGS. 11A and 11B show two tables providing examples of two OR'ing methods used to calculate the maximum quantized difference.

DETAILED DESCRIPTION

Figure 1:
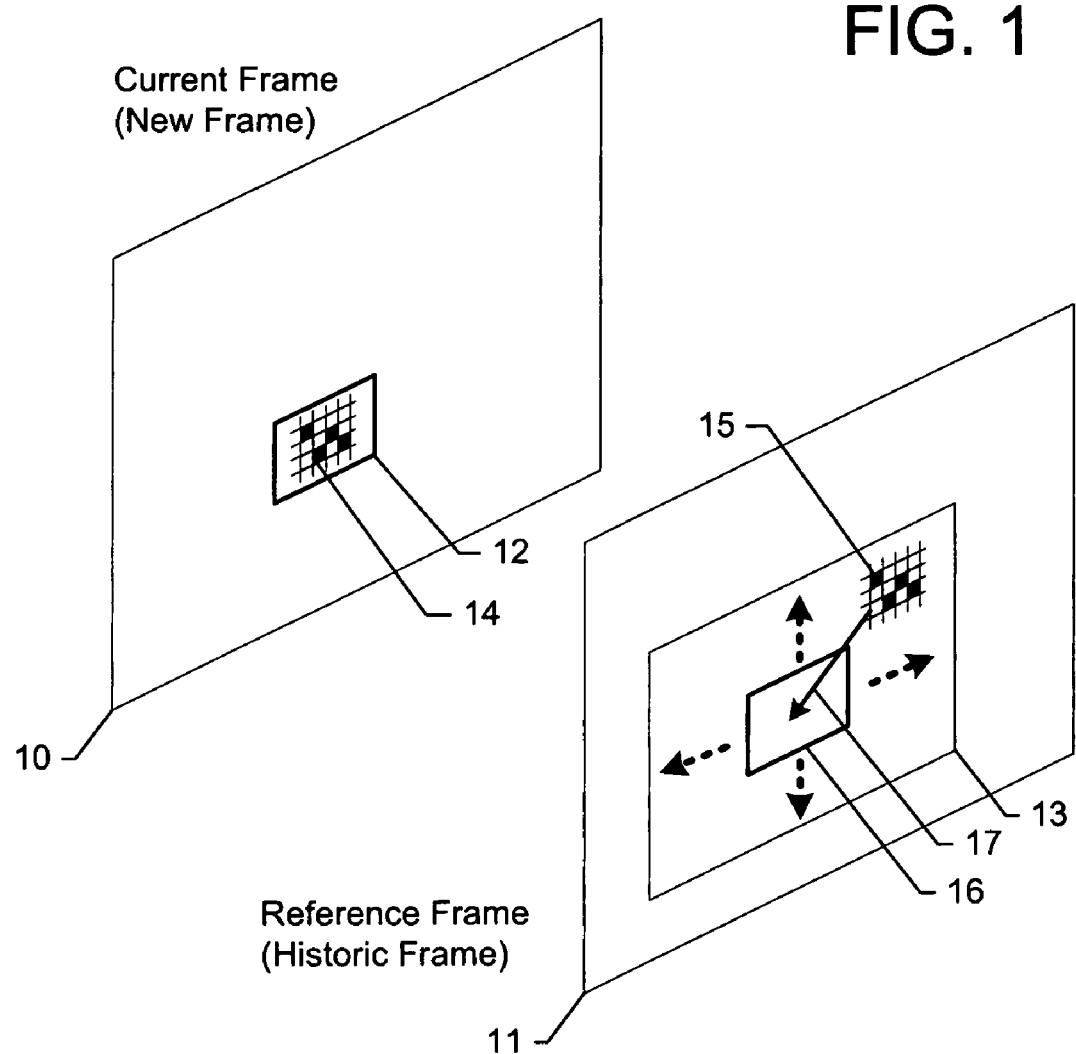
FIG. 1 is an illustration of an inter frame search method.

The present invention provides a pixel comparison circuit. In the preferred embodiment, a circuit incorporating a minimal number of logical carry operations is derived, enabling the implementation of a shallow pipelined comparison circuit capable of high-speed operation. Referring back to FIG. 1, frame 10, referred to herein as "current frame" is compared with existing frame 11, referred to herein as "reference frame or historic frame." To locate artifacts in the new frame that may already exist in the reference frame, subject block 12 of the current frame is specified and a block with similar features is sought in the reference frame. Due to the high computational nature of such searches, a constrained search area 13 of the reference frame is usually specified and searched. As a specific example, search area 13 of reference frame 11 is searched for pixel pattern 14 of subject block 12 with the objective of finding similar pattern 15 at a different location in the reference frame. This is accomplished by comparing pixels in search block 16 with pixels in subject block 12 and repeating the operation for different search block locations within the search area. In some cases, the exact pattern may appear and in other cases, for example a video sequence, the patterns may be correlated but not necessarily identical due to lighting and aspect effects as subjects in the image move around.

Figure 6:
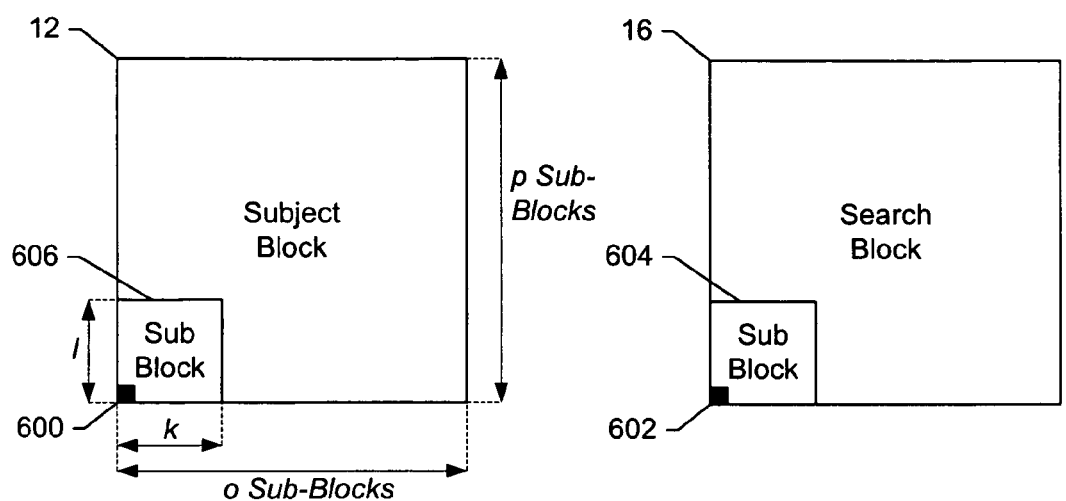
FIG. 6 is a diagram showing the subject block, search block and sub-blocks used by the search method.

The comparison circuit of the present invention compares subject block 12 of the current frame with search block 16 of the reference frame to find a motion vector 17 that identifies the new location for one or more artifacts. A series of acts are performed to accomplish the comparison. FIG. 6 defines the frame elements used by the comparison method. Referring to FIG. 6, the difference between pixel A 600 in the subject block of the current frame and pixel B 602 at the same location in the search block of the reference frame is approximated by the calculation of a quantized difference (QD) value. As indicated in FIG. 6, subject block 12 is divided into multiple sub-blocks 606 of dimensions k×l pixels and search block 16 is also divided into multiple sub-blocks 604. In the preferred embodiment described, the search block is two sub-blocks wide (i.e. o=2) by two sub-blocks high (i.e. p=2), giving a total of 4 sub-blocks, each of dimension 4×4 pixels. Next, the QD for all pixel locations of search sub-block 604 is calculated using the same QD method for each comparison calculation. A determination of the maximum quantized difference (MQD) value is made using an OR'ing method to determine the OR'd quantized difference (OQD) over search sub-block 606. Finally, the summation of MQDs for all sub-blocks of search block 16 is performed to derive the sum of maximum quantized difference (SQMD). Using approximation logic, the OQD values are reduced by a summation circuit to provide the sum of OR'd quantized difference (SOQD), which is an approximation of differences between blocks 12 and 16.

Each act is discussed in further detail below for the preferred embodiment that compares two images comprised of unsigned 8-bit integer pixels. This method of the present invention is also appropriate for the comparison of signed pixels and is also extensible to higher resolution (e.g. 16-bit) pixel applications and beyond to general integer comparisons. To enable the comparison of signed pixels, either the pixels may first be converted to unsigned values via standard conversion methods and circuitry or the process and circuitry may be extended to enable both unsigned or signed value support.

Calculation of the QD Between Two Pixels

Pixel A at co-ordinates (x,y) of the subject block is compared with reference pixel B in the search block of the reference frame where pixel B is offset from pixel A by vector (r, s). The QD between pixel A and pixel B is derived using the following non-linear transformation equation.

$$QD(x,y,r,s)=f(x,y,r,s) \qquad (3)$$

Rather than calculating the absolute difference between the two pixels as is performed by SAD algorithm, this embodiment of the present invention calculates a non-linear quantized difference. This transformation is based on a series of operations in conjunction with a set of comparison tables. A 3-bit comparator uses a comparison table to derive a quantized difference value bit for the comparison of correspondingly significant 3-bit segments in search block and subject block pixels. The comparator performs bit-overlapped comparisons of all adjacent 3-bit segments from the most significant 3-bit segment to the least significant 3-bit segment in addition to 2-bit and single-bit comparisons for the least significant bits. The 3-bit segments are compared using a 3-bit comparison table as described below and a single quantized output bit is generated for each comparison. In the case where the two least significant bits are compared, the segment length is 2 bits. The corresponding 2-bit segments are compared using a 2-bit segment comparison as described below and a single quantized output bit is generated. In the case where only the least significant bits are compared, the least significant bit (lsb) comparison described below generates a single quantized output bit. The most significant bit (msb) of the quantized output is generated by special case msb comparison rather than the 3-bit comparison mentioned. This msb method applies special logic to the case of bits in the comparison table preventing wrapping between 000 and 111. The transform generates a quantized value of the same number of bits as the original pixels. This quantized value is filtered to form the quantized difference QD.

Three Bit Comparison

The preferred embodiment uses a series of 3-bit comparisons to compare 8-bit unsigned pixels. A comparator circuit uses a comparison table to generate a 1-bit output value. The table applies the following logic when comparing a 3-bit subject value with a 3-bit reference value, generating either a binary 0 to indicate a near- or perfect-match and a binary 1 to indicate a mismatch. In this embodiment an output bit value of 0 is generated when the 3-bit values match. An output value of 0 is also generated for the two comparisons on either side of the match (i.e. when there is an absolute difference of less than three between the two values), resulting in five 3-bit comparisons that may generate a 0 output. When the absolute difference between the two values is greater than two (i.e. the remaining three comparison outcomes), the comparator output is set to 1. To illustrate this method, FIG. 7 is provided as an example to show all of the possible outcomes generated by the 3-bit comparison logic for the comparison between a subject pixel segment of binary value 110 when compared with any 3-bit segment value of a reference pixel.

Referring to FIG. 7, the 3-bit subject value segment is placed in the 3-bit Subject Value A column (reference numeral 70), and compared to 3-bit segment Reference Values B in column (reference numeral 72). Note that the reference values are listed sequentially and wrap from 111 to 000 for continuity (reference numeral 74). Where value A matches the reference B (reference numeral 76), the quantized value is 0. The two reference values on either side of the matching reference are also quantized to 0 resulting in five 3-bit combinations that are quantized to 0 (reference numeral 77). The three 3-bit reference values with the biggest mismatch with subject value A are set to 1 (reference numeral 78). For each 3-bit comparison performed, the quantized output value (reference numeral 79) populates the same position of the quantized result as the most significant bit (msb) of the input segments. For example (using lsb referenced as b0), the 3-bit comparison output generates b2 of the quantized result when comparing bits b0, b1 and b2 of the subject pixel to b0, b1 and b2 of the reference pixel.

Two Bit Comparison

To generate the quantized output bits b1 and b0, the table is modified to enable the 2-bit comparison. The two bits b1 and b0 of the subject value and the reference value are appended with a least significant or "don't care" bit "x" to form a 3-bit value as before. FIG. 8 is an example showing all of the quantized values that may be generated when comparing a subject having the least significant two bits of binary value 11 to different 2-bit reference values. In the example shown, the 2-bit subject value is appended from 11 to 11x (reference numeral 80). The 2-bit reference segment is also appended with an x in the least significant bit location (reference numeral 82). The comparison table then applies a modified 3-bit comparison. The matching values A and B (reference numeral 84) are quantized to 0 as before. The comparison table also generates a match (0) when the subject and reference have an absolute difference of less that two between the original 2-bit values (reference numeral 86). Differences greater than one between subject and reference generate a 1 (reference numeral 88).

Bit 0 of the quantized output value is set to 0 if b0 of subject pixel A matches b0 of reference pixel B, otherwise it is set to 1. The most significant bit is generated by a different comparison table to that used in the 3-bit comparison of other segments to support cases where bits in the comparison table wrap between 000 and 111 in close proximity to a matched comparison and a corresponding wrap in the msb output value is not allowed.

FIG. 9 shows the comparison table for msb b7 using the previous binary 110 subject example. In this case, the matching 3-bit value is quantized to 0 as before (reference numeral 90). However, the two adjacent values (i.e. the case where the absolute difference would be less than three) are set to zero (reference numeral 92) only if there is no wrap between 111 and 000. In the case where the reference value wraps, the quantized output is set to 1 (reference numerals 94 and 95). The 3-bit reference values that have the biggest mismatch with the subject value A are set to 1 (reference numeral 96) as occurs for the previous 3-bit comparison.

Quantized Output Value Filter

The quantized output bits from the eight comparisons are assembled into an 8-bit value. The quantized output value is then filtered such that only the most significant 1 is held as valid (where 1 identifies a significant difference) and all other 1's are cleared to 0. Therefore, in the case of an 8-bit pixel embodiment, the output of the quantized table has only nine valid output values after this filter is applied. These are 0 and power of 2 values 1, 2, 4, 8, 16, 32, 64 and 128.

FIG. 10 shows the number and range of matches for each of the valid quantized outputs of the 8-bit embodiment. The table lists the valid quantized outputs in decimal (reference numeral 100) and binary (reference numeral 102) formats and the typical number of matches (reference numeral 104) generated dependent on the proximity of the two pixel values. The table also shows the range of absolute difference for each quantized output value (reference numeral 106). As the table shows, the quantized output method generates accurate small steps in difference when the difference is small and less accurate larger steps as the difference increases. This provides the high accuracy when comparing different closely matched pixel pairs where high accuracy is required and less accuracy for the larger differences where high accuracy is not required. In an alternative embodiment of the comparison method, an absolute difference between two pixel values is calculated and the result is quantized to a single bit represented by the most significant bit of the difference result. This alternative comparison method is less useful as it introduces a greater quantization error. For example, using this method a quantized output value 2 (binary 10) represents an absolute difference of either 2 (binary 10) or 3 (binary 11). Using the preferred method however, a quantized output value of 2 represents strictly a difference of 2 (row 108). Therefore the preferred method disclosed provides a more accurate comparison of two values that is also simpler to implement.

There are a number of variations on the comparison table or equation (3). One alternative is to use simple equations. An example is a set of equations that still compares three bits at a time but produces four matching results rather than five matching results (reference numeral 77) for some comparison values. This approach may be easier to implement as logic gates but it produces a greater error. The structure of using "1 of n" selected bits is used in the preferred embodiment as it allows the output to be logically OR'd with other difference values to easily produce the maximum difference. An alternative embodiment utilizes a method that uses longer segments in the comparison. For example, the comparison of four bits at a time where nine comparison outcomes generate a "0" (or match) and seven comparisons generate a "1" (or mismatch). This approach results in a lower quantization error but requires more logic circuitry. The preferred embodiment describes an 8-bit unsigned pixel implementation but the method is equally applicable to n-bit implementations and signed values as discussed. In these alternative embodiments, the corresponding segment lengths may be proportionally extended or defined as specified in this embodiment.

Calculation of the QD for a Sub Block

Once the QD comparison of the first pixel pair has generated the first quantized difference value, the QD calculation is repeated for all the pixel pairs over the search sub-block.

Calculation of an Approximate MQD

Once all the QD values have been determined, the maximum quantized difference (MQD) is determined over the sub-block. The MQD for a sub block size K pixels wide by L pixels high as depicted in FIG. 6 is defined by the equation:

$$MQD(x, y, r, s) = \max_{i=0, j=0}^{k-1, l-1} QD(x+i, y+j, r, s) \quad (4)$$

As the QD is only an approximation of the absolute difference, the MQD will only be an approximation of the maximum absolute difference. In the preferred embodiment, a determination of the MQD, herein termed the OQD, is generated by an OR'ing process as illustrated by way of example in FIGS. 11A and 11B. The two tables shown list the quantized results generated by the 3-bit comparator logic using (3) for the same example case of a 4×4 pixel sub-block comparison. However, FIG. 11A uses a different embodiment of the OQD calculation to FIG. 11B.

FIG. 11A shows one embodiment of the OQD calculation. Each of 16 pixel comparisons generates an 8-bit quantized value. Each value is filtered to clear all but the most significant 1. The filtered values are then logically OR'd together to generate a quantized output which has multiple set bits (reference numeral 110). The OR'd value is filtered again, once again removing all but the most significant 1 (reference numeral 112). In this example, the less significant 1's have been filtered twice, which is unnecessary. The numbers only need to be filtered as a final act as illustrated in FIG. 11B. FIG. 11B shows a preferred embodiment that demonstrates that it is unnecessary to filter the results twice as shown in example FIG. 11A. In FIG. 11B, the same solution is shown but the individual quantized differences are not filtered prior to entry in the OR'ing table, resulting in different OR'd value (reference numeral 114). This output is only then filtered for the most significant 1 producing the same maximum quantized value answer (reference numeral 116) as in FIG. 11A.

Calculation of a SMQD

The sum of the maximum quantized differences (SMQD) for a block sub blocks wide by p sub block high is defined by the equation:

$$SMQD(x, y, r, s) = \sum_{m=0}^{o-1} \sum_{n=0}^{p-1} MQD(x+m \times k, y+n \times l, r, s) \quad (5)$$

Figure 2:
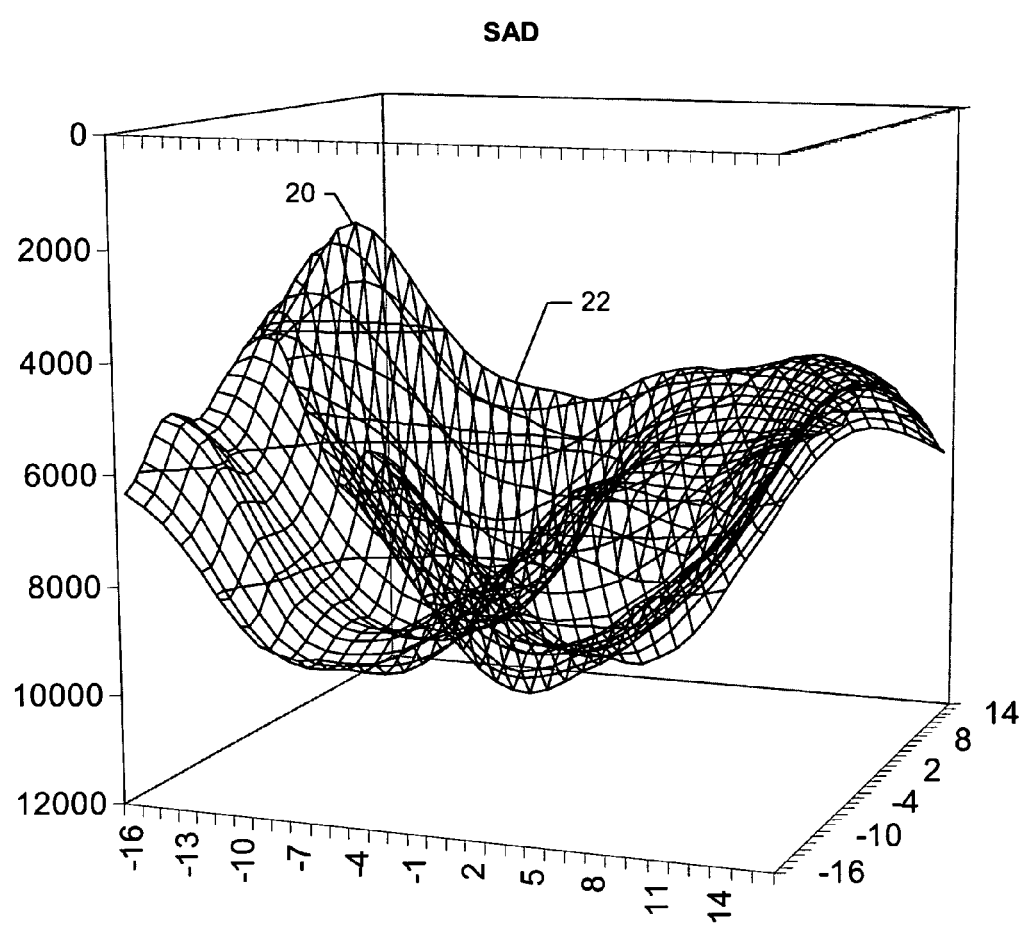
FIG. 2 is a plot of the search results for a +/−16 pixel search using a sum of absolute difference (SAD) algorithm.
Figure 3:
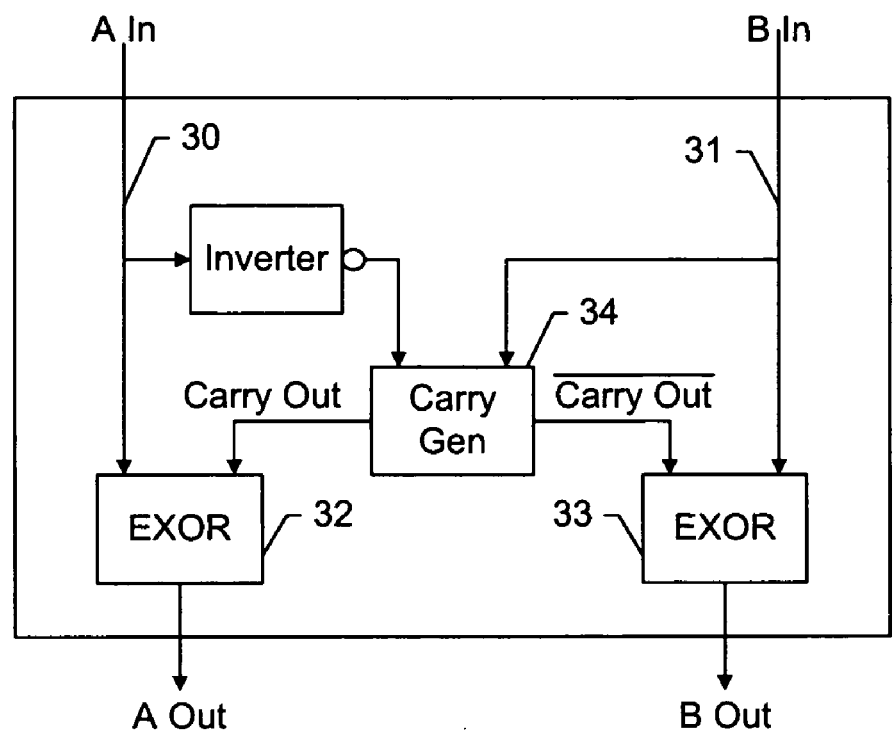
FIG. 3 is a block diagram of the inverter circuit used to create an absolute value result when two values are summed together.
Figure 4:
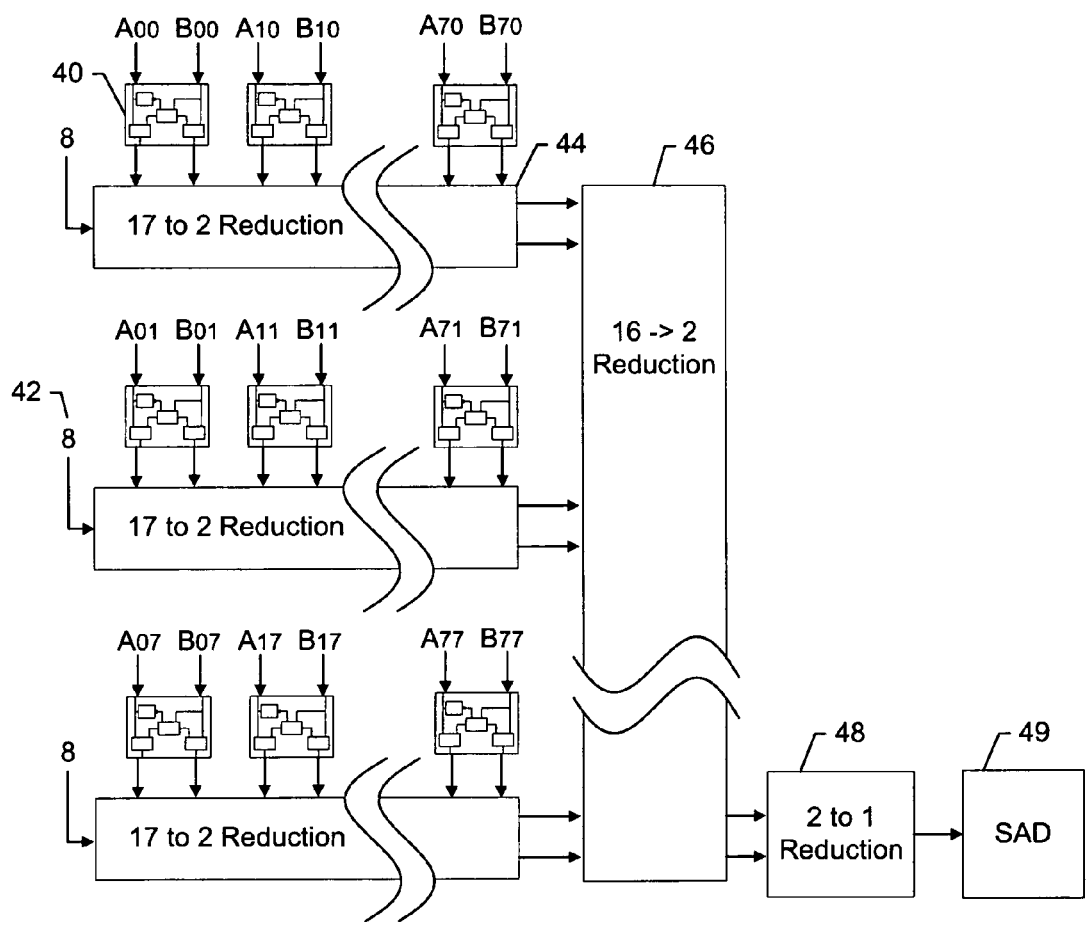
FIG. 4 is an illustration of an 8×8 SAD circuit.
Figure 5:
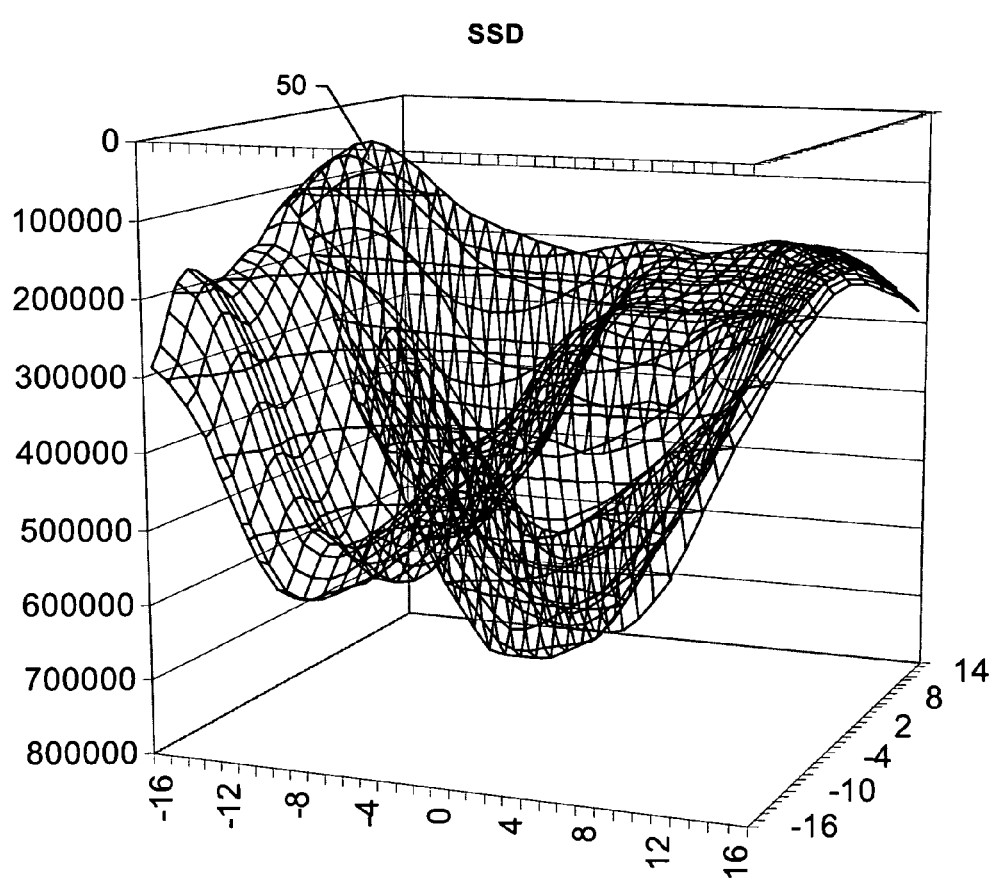
FIG. 5 is a plot of the search results for a +/−16 pixel search using a sum of squared differences (SSD) algorithm.
Figure 12:
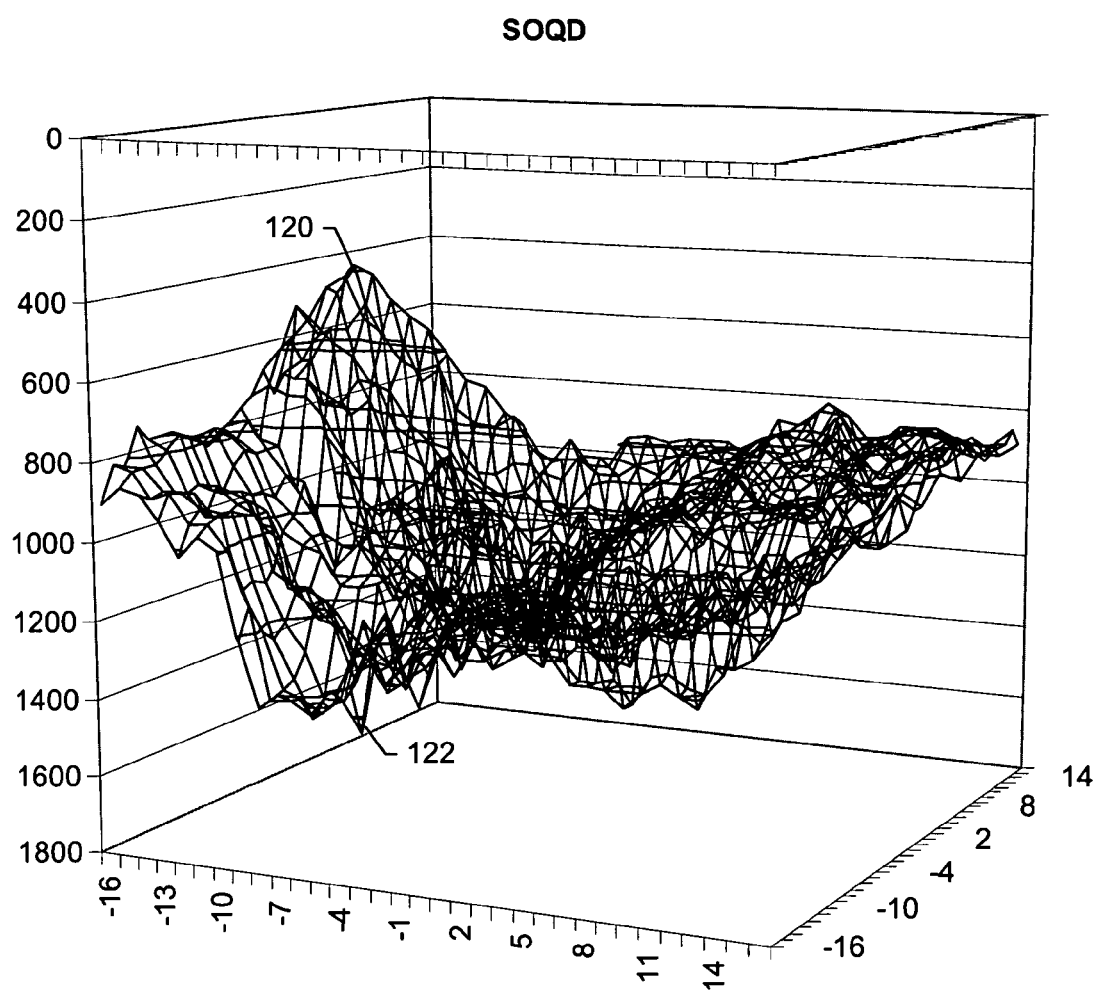
FIG. 12 is a plot of the search results for a +/−16 pixel search using a Sum of OR'd Quantized Differences (SOQD) algorithm.

The maximum quantized values from multiple sub blocks are summed together to generate a difference estimate for search block 16. In an embodiment, the absolute difference is approximated by the QD, hence the maximum difference is approximated by the OQD and the sum of maximum differences is approximated by the SOQD. FIG. 12 illustrates a graph showing an example result from the SOQD calculation for the same search as conducted on the "foreman" test video sequence using the SAD (FIG. 2) and the SSD (FIG. 5) methods. The difference calculations generate the same minimum difference location (reference numeral 120). The graph also shows the quantization noise, which is more obvious at the higher difference values (reference numeral 122).

Quantization Error Effects

In the case of the 3-bit comparison method described, the comparison table generates approximate output values dependent on the degree of match of corresponding pixels and influence of 000 to 111 transitions in the table. The method produces accurate results for comparisons where the 3 least significant bits exactly match, but the quantization error in the output grows exponentially as the difference between the two pixels increases and higher order bits are not matched. As a result, when the search block is highly correlated with the subject block (as is the case when the two blocks have the same features), the method produces a low quantization error and the motion vector for the search block may be accurately identified. As the correlation between the search block and the subject block decreases, so the quantization noise increases and therefore the accuracy of the comparison and its resulting motion vector decreases. The described SOQD comparison approximation method is applied to the comparison of pixel blocks from different frames in a video encoding application, however the method is equally applicable to other applications that may benefit from the efficient comparison of arrays of data. Other applications include other media streams where close but approximate comparisons are used to compress data with little noise. While the SOQD approximation method described is applied to two dimensional block comparisons, the method is not limited to two dimensions and may be extended to n-dimensional searches, including linear searches and three dimensional searches, etc.

QD Circuit Description

Figure 13:
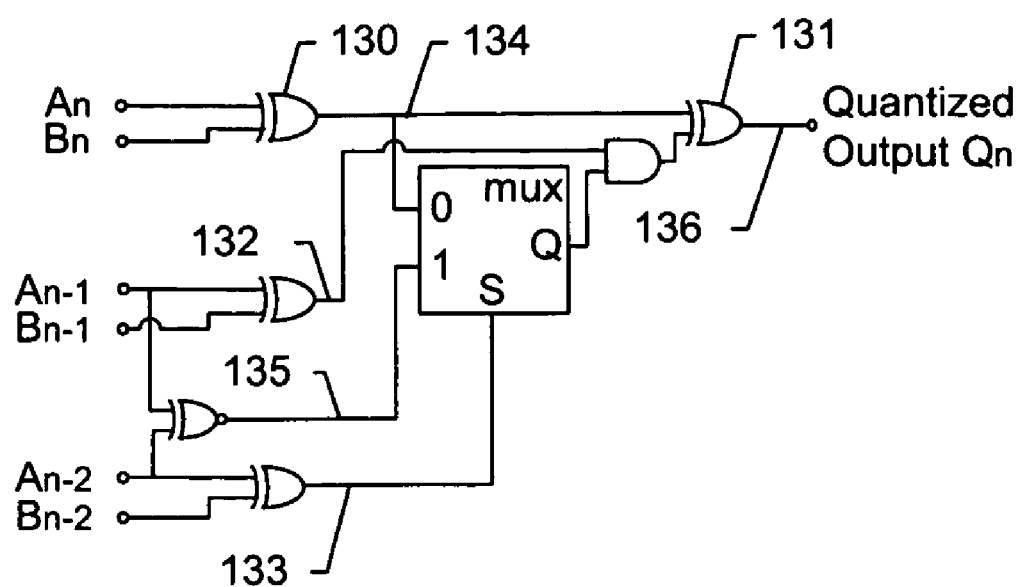
FIG. 13 is a logic diagram of the single bit quantized difference circuit used by the invention.

FIG. 13 shows a circuit that can be used to generate a single output bit of the comparison table. The circuit compares bits An and Bn using XOR gate 130 and then inverts the XOR output using XOR gate 131 as required. The required conditions are a) if An−1 does not equal Bn−1 (reference numeral 132) and one of two conditions is true. If An−2 equals Bn−2 133 then An must not equal Bn (reference numeral 134) for the XOR output to be inverted, and b) when An−2 does not equal Bn−2 (reference numeral 133), then the XOR output is inverted (reference numeral 135) when An−1 is not equal to An−2.

The circuit in FIG. 13 may appear complex if only a single output generated by a 3-bit comparison is considered. However, as shown in FIG. 14, much of the circuit is shared in any practical embodiment that generates multiple output bits.

Figure 14:
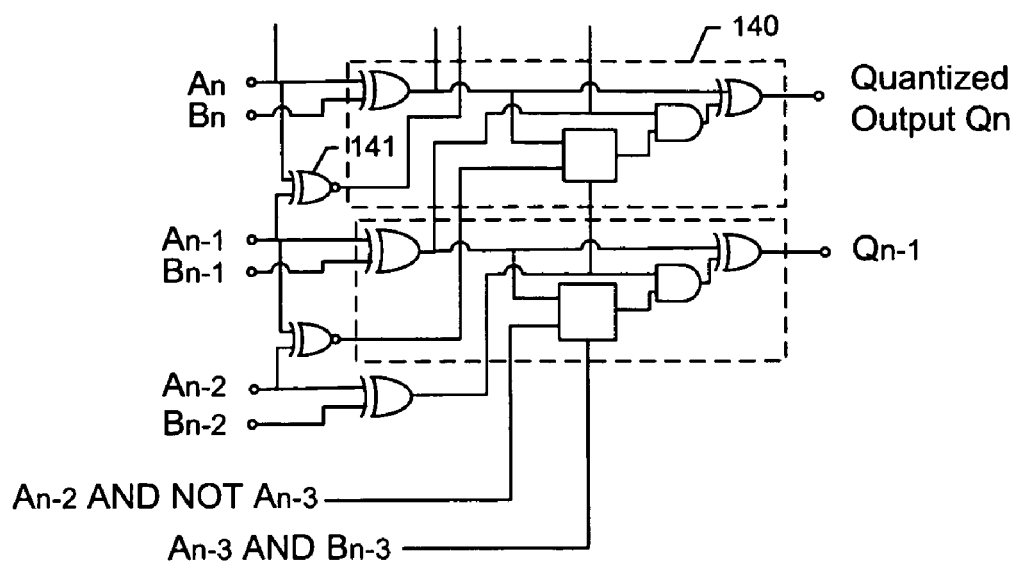
FIG. 14 is a logic diagram showing how two single-bit quantized difference circuits share circuitry.

FIG. 14 shows a quantized difference circuit that generates two output bits. Reference numeral 140 indicates that the two XOR gates, a multiplexer and an AND gate define the logic unique to each bit of the quantized difference circuit. XNOR gate 141 may be excluded from the logic count as it is shared between multiple difference circuits.

Figure 15:
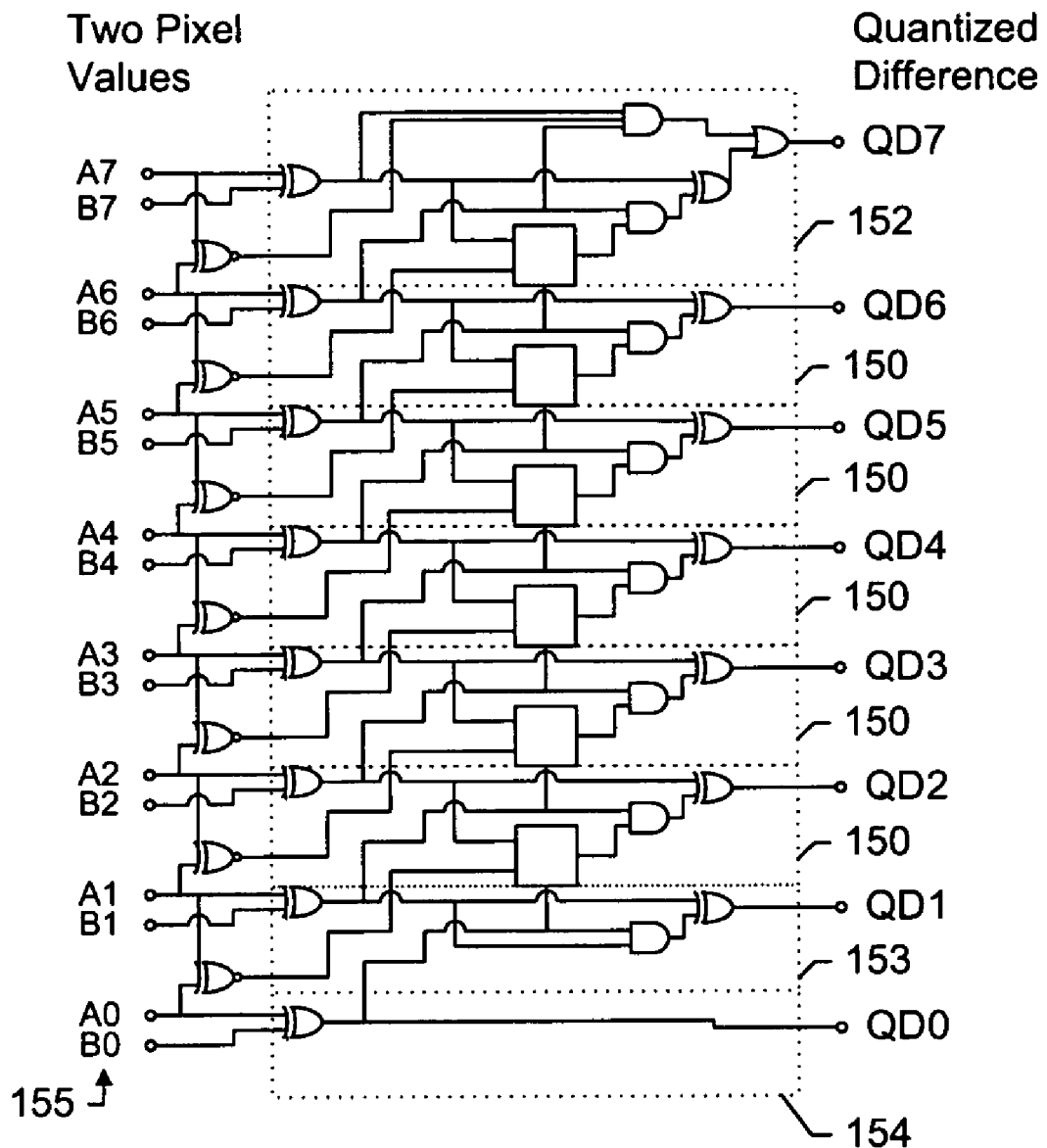
FIG. 15 is a logic diagram for an 8-bit pixel comparison circuit that produces a quantized absolute difference.

FIG. 15 shows the complete quantized difference circuit for an 8-bit embodiment. The circuit takes the two 8-bit pixel values (reference numeral 155) and generates an 8-bit quantized difference. The circuit includes five of the standard bit comparison circuits (reference numeral 150). The two least significant bit comparison circuits (reference numerals 153 and 154) have the unused logic removed, while most significant bit compare logic 152 has the additional logic necessary to prevent the msb wrap described above.

Comparison Between QD Circuit and Sad Implementation

The 8-Bit Quantized Difference circuit is approximately the same size and complexity as the inverter circuit used in the SAD calculation. However, this circuit is improved in that the worst-case propagation path has only four logic gate delays in length compared with approximately 10 gates for the equivalent SAD inverter. Additionally, the output from the QD circuit provides a difference value whereas the output from the SAD inverter provides only one inverted value and requires an additional 8-bit full adder in order to generate a difference value.

OQD Circuit Description

Figure 16:
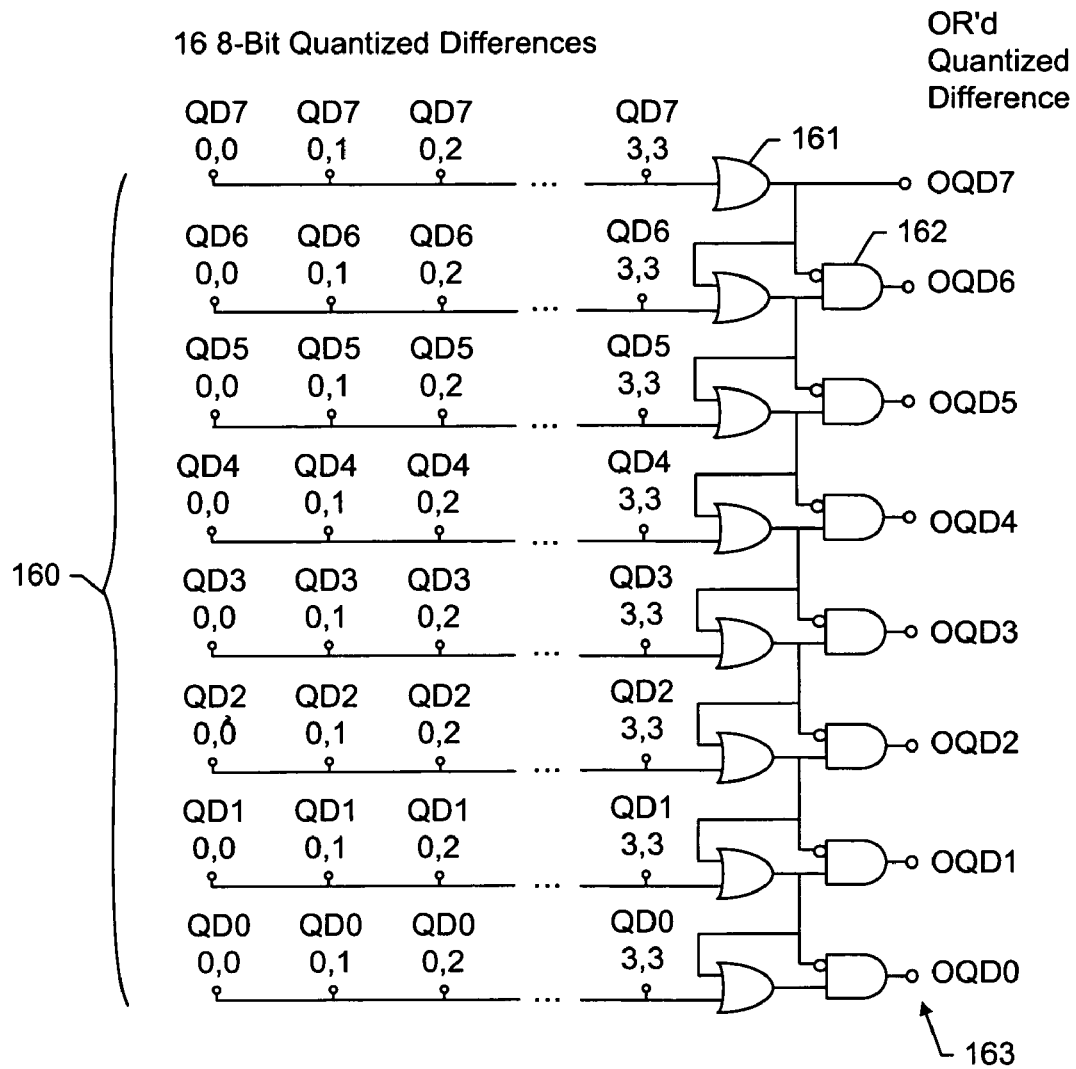
FIG. 16 is a logic diagram of the OR circuit used to combine 16 quantized values.

FIG. 16 shows an example embodiment of the OR'ing circuit used to generate the OQD for sixteen 8-bit quantized differences (reference numeral 160). The diagram is a simplified illustration of the OR'ing circuit in which each bit of the sixteen 8-bit quantized differences is OR'd (reference numeral 161) with the corresponding bit from the 15 other pixels. The AND gates with single inverted input 162 are used to create the 1 of 8, 8-bit output 163 which is the OQD between the 16 subject pixels A and the 16 reference pixels B.

Comparison Between OQD Circuit and SAD Implementation

The OR'ing method and circuitry of the invention provides the greatest improvement in performance and size over the traditional SAD circuit. The worst-case circuit path is much shorter then the SAD circuit allowing it to run at higher frequencies, or without pipeline registers. The OR'ing circuit is also smaller than the full adder circuits. By way of comparison, a 16 pixel SAD circuit requires 31 full adders of between 8 and 13 bits each, an estimated total of 2232 gates assuming 72 gate 8-bit adder implementations. The OQD circuit requires only eight 16-input OR gates and eight AND gates, equivalent to 136 gates.

SOQD Circuit Description

Figure 17:
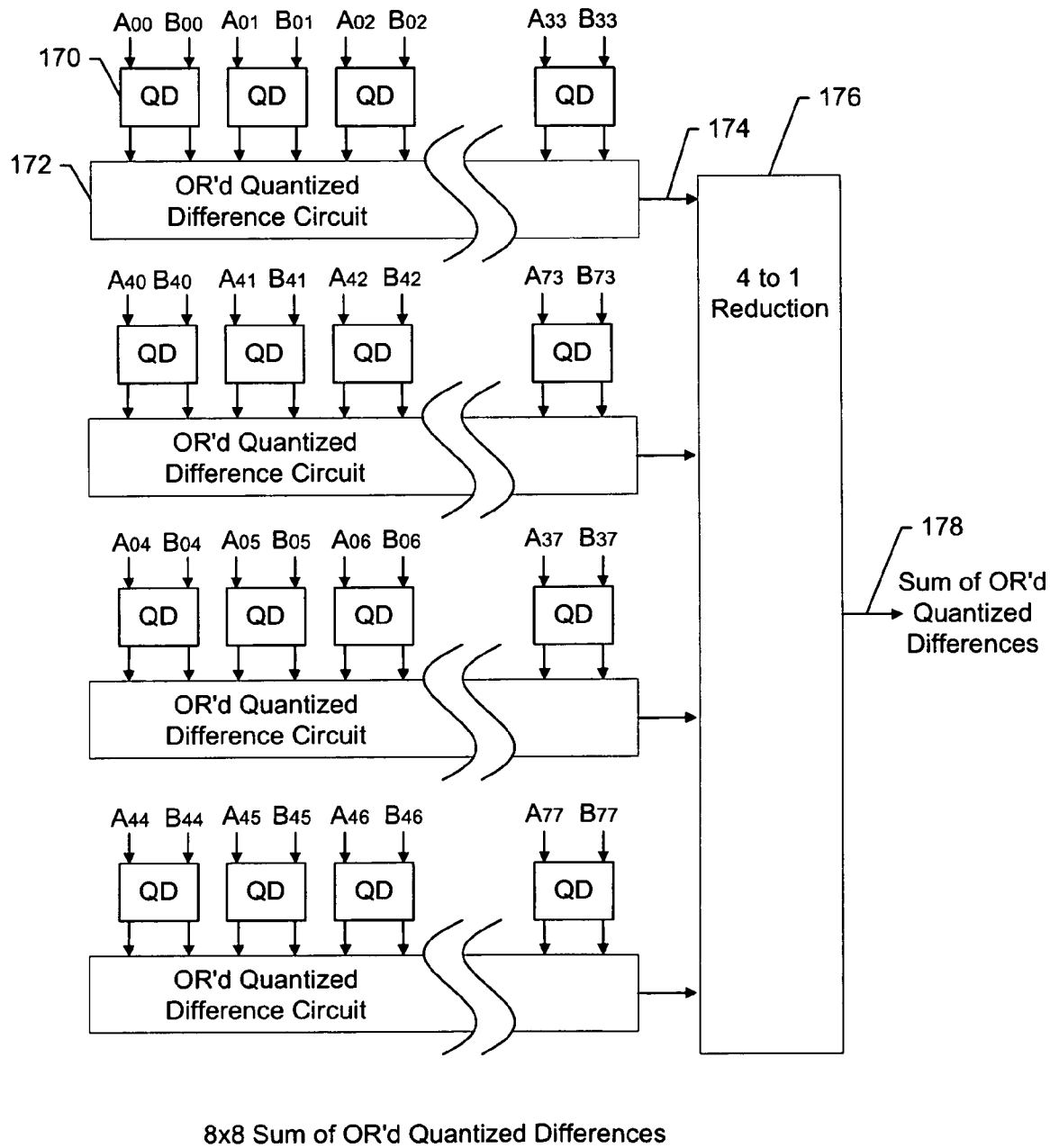
FIG. 17 is a block diagram of an 8×8 Sum of OR'd Quantized Differences circuit.

FIG. 17 shows a full 8×8 sum of OR'd quantized differences (SOQD) circuit. There are 64 quantized difference (QD) circuits 170 as detailed in FIG. 15 that are OR'd together in four OR'd quantized difference (OQD) circuits 172. 8-bit outputs 174 from the OQD circuits are summed in 4-to-1 reduction circuit 176 producing a sum of OR'd quantized differences (SOQD) (reference numeral 178).

Comparison Between SMQD Circuit and Sad Implementation

The SOQD reduction circuit in the present invention sums values and sets 1 of 8 bits in an 8-bit output. These results will not generate long carry values and therefore do not need fast carry circuits. As a result, the reduction circuit may be both faster and simpler than the reduction circuit in a SAD implementation.

Circuit Variations

In an embodiment, a 16×16 SOQD is created from sixteen 4×4 OQD circuits and their QD circuits. The 16 results are summed using a 16-to-1 reduction circuit similar to the 4-to-1 reduction circuit described above. Another variation of the embodiment of the circuit includes increasing or decreasing the number of QD's OR'd together before the summation process. One solution is to remove the OR'ing function altogether and convert the quantized differences to 8-bit values before summing them. This circuit produces result similar to the SAD circuit but provides a limited saving in circuitry. Another solution is to remove the reduction or summing circuit and OR all of the results together. This works well for the comparison of small areas but only generates approximate results for the comparison of large areas.

Another variation is to use the SOQD circuit for an approximate first pass search to find a general area where the best result is found. Then the final selection is made using a second search using the traditional SAD circuit. Yet another embodiment of the invention divides the search block into 4×4 sub blocks. Then the results from the individual 4×4 sub blocks may be used to determine if the search block requires two or more motion vectors.

The circuits described in the preferred embodiment compare two images comprised of unsigned 8-bit integer pixels. These circuits are also appropriate for the comparison of signed pixels. To enable the comparison of signed pixels, either the pixels may first be converted to unsigned values via standard conversion circuitry or the circuits may be extended to enable both unsigned or signed value support.

While methods and apparatus for data comparison in image processing and motion search has been described above and illustrated in detail, it is to be understood that many modifications can be made to the various embodiments of the present invention without departing from the spirit thereof.

What is claimed is:

1. A method for performing difference measurements between blocks of pixels to detect motion described in a sequence of video data frames utilizing a pixel comparison circuit, the method comprising:

Determining, by the pixel comparison circuit, a motion vector by comparing a second data subset of a current data frame with a first data subset of a reference data frame and calculating a non-linear, quantized difference value between a first pixel value contained in a first location of the second data subset and a second pixel value contained in a second location of the first data subset of the reference data frame, the second pixel value located at a position offset from the first pixel location by the determined motion vector; and Translating, by the pixel comparison circuit, the motion vector to locate at least one artifact appearing in the current data frame that also appears in the reference data frame.

2. A method for performing difference measurements between a first data set and a second data set to enable encoding of a data set for transmission utilizing a pixel comparison circuit, the method comprising:

dividing, by the pixel comparison circuit, the first data set into a first plurality of data subsets;

dividing, by the pixel comparison circuit, the second data set into a second plurality of data subsets having equal numbers of data values and dimensions as the data subsets of the first plurality, each data value described by a plurality of bits;

comparing, by the pixel comparison circuit each data subset of the first plurality with multiple data subsets of the second plurality, wherein comparisons are made between pairs of data values, the first data value in the pairs belonging to a data subset of the first plurality and the second data value in the pairs belonging to a data subset of the second plurality, the first data value in each pair corresponding to the second data value in the pair, the comparison made between first multiple portions of bits in the first data value in the pairs and a second multiple portions of bits in the second data value in the pairs;

calculating, by the pixel comparison circuit a quantized difference value for each compared pair of data values from the comparison made between first multiple portions of bits in the first data value in the pair and a second multiple portions of bits in the second data value in the pair;

performing, by the pixel comparison circuit a Boolean OR operation on multiple quantized difference values to generate partial difference measurements for discrete portions of each subset of the first data set to determine a maximum quantized difference value for each discrete potion of each subset;

assembling the maximum quantized difference values into a data set representing difference measurements between the first data set and the second data set; and encoding the first data set for transmission using the difference measurements to reduce the amount of data encoded.

3. The method of claim 2, wherein assembling the maximum quantized difference values comprises performing Boolean OR operations on the maximum quantized difference values.

4. The method of claim 3, wherein assembling the maximum quantized difference value comprises zeroing all bits in the maximum quantized difference value except the maximum quantized difference value's most significant bit.

5. The method of claim 2, wherein assembling the maximum quantized difference values comprises zeroing all bits in the maximum quantized difference values except the maximum quantized difference value's most significant bit before performing additional assembly operations.

6. The method of claim 5, wherein additional assembly operations comprises summing the modified maximum quantized difference values.

7. The method of claim 2, wherein assembling the maximum quantized difference values comprises summing the maximum quantized difference values.

8. The method of claim 2, wherein assembling the maximum quantized difference values comprises summing a scaled adjustment to each maximum quantized difference value.

9. The method of claim 2, wherein assembling the maximum quantized difference values comprises combining multiple maximum quantized difference values before performing additional assembly operations.

10. The method of claim 2, wherein data values in the first data set and second data set are unsigned, integer values.

11. The method of claim 2, wherein the data values in the first data set and second data set are signed integer values, further comprising converting the signed integer values to unsigned integer values.

12. The method of claim 2, where in the comparison of the most significant of the portions of bits of the two data values is adjusted to match the type of data, wherein the type of data is one of group consisting of: signed integer values and unsigned integer values.

13. The method of claim 2, wherein calculating quantized difference values comprises comparing data values in a subset of the first plurality of subsets with data values in a subset of the second plurality of subsets, the location of the subset of the second plurality of subsets is offset from the location of the subset of the first plurality of subsets by a vector.

14. The method of claim 2, wherein calculating the quantized difference of multiple portions of bits comprises performing a bit-overlapped comparison between correspondingly significant multi-bit segments of the first data value and the second data value.

15. The method of claim 2, wherein calculating the quantized difference of multiple portions of bits comprises performing a bit-overlapped comparison between correspondingly significant 3-bit segments of the first data value and second data value.

16. The method of claim 15, wherein the bit-overlapped comparison is performed between all overlapping 3-bit segments within the first data value and the second data value, beginning with a most significant 3-bit segment and progressing to a least significant 3-bit segment, wherein for each bit-overlapped comparison, a three-bit segment quantized difference value bit is generated.

17. The method of claim 15, wherein a comparison is performed between a least significant 2-bit segment of the first data value and a least significant 2-bit segment of the second data value, and a 2-bit segment quantized difference value bit is generated.

18. The method of claim 17, wherein the quantized difference value bit indicates one of the group consisting of an acceptable match between compared data values and a mismatch between compared data values.

19. The method of claim 18, wherein the two-bit segments are extended to three bits by setting a new most significant bit to the inverse value of the two-bit segment's most significant bit, and an acceptable match is defined as an unsigned absolute difference of less than one between compared three-bit segments of data values.

20. The method of claim 18, wherein a match is defined as an absolute difference of less than a defined value between compared segments of data values, wherein the absolute difference is the lesser of an absolute difference calculated by treating the two segments as unsigned integers and an absolute difference calculated by treating the two segments as signed integers.

21. The method of claim 15, wherein a least significant bit of the first data value is compared with a least significant bit of the second data value, and a least significant bit quantized difference value bit is generated.

22. The method of claim 15, wherein the most significant segment of the first data value is compared with a most significant segment of the second data value, using a different comparison method then the other segment comparisons, and a most significant bit quantized difference value bit is generated.

23. The method of claim 15, wherein the quantized difference value bit indicates one of the group consisting of an acceptable match between compared data values and a mismatch between compared data values.

24. The method of claim 20, wherein the 3-bit segments are extended to 4 bits by setting a new most significant bit to the inverse value of the 3-bit segment's most significant bit, and an acceptable match is defined as an unsigned absolute difference of less than three between compared four-bit segments of data values.

* * * * *